United States Patent [19]
Lang et al.

[11] Patent Number: 5,299,666
[45] Date of Patent: Apr. 5, 1994

[54] RESETTABLE PILOT OPERATED TORQUE LIMITER

[75] Inventors: David J. Lang; Eric Stoutenborough, both of Rockford; Gary Gillingham, Cherry Valley, all of Ill.

[73] Assignee: Sundstrand Corporation, Rockford, Ill.

[21] Appl. No.: 950,794

[22] Filed: Sep. 24, 1992

[51] Int. Cl.$^5$ ............................................. F16H 57/10
[52] U.S. Cl. ..................................... 188/134; 192/8 R
[58] Field of Search ........................... 188/134, 82.9; 74/411.5, 412 TA; 192/8 R

[56] References Cited
U.S. PATENT DOCUMENTS

| | | | |
|---|---|---|---|
| 1,462,318 | 7/1923 | Beyl | 188/82.9 |
| 3,653,226 | 4/1972 | Westbury | 188/134 X |
| 4,009,770 | 3/1977 | Schreyer | 188/134 X |
| 4,030,578 | 6/1977 | Cacciola et al. | 188/134 |
| 4,459,867 | 7/1984 | Jones | 74/412 TA X |

*Primary Examiner*—Andres Kashnikow
*Assistant Examiner*—Alfred Muratori
*Attorney, Agent, or Firm*—Wood Phillips VanSanten Hoffman & Ertel

[57] ABSTRACT

Volume, weight and complexity difficulties in the fabrication of torque limiters are avoided in a construction including a housing (10), a shaft (20) journalled in the housing (10) and adapted to be connected to a source (22) of rotary power, and a rotary output (28) journalled in the housing (10). A ball ramp coupling (44) is disposed within the housing (10) and includes an axially movable drive element (46) coupled to the shaft (20), a driven element (42) coupled to the output (28), a spring (52) biasing the elements (42,46) towards each other, facing ramps (61,62) in the elements (42,46) at the interface of the elements and balls (64) in the ramps. A first set of teeth (72) is carried by the drive element (46) while a second set of teeth (82) is carried by the housing (10) and aligned with the first set of teeth (72). When resistance to rotation of the output (28) is encountered relative movement between the elements (42,46) will occur which in turn will cause the ball (64) to move the drive element (46) axially relative to the driven element (42) causing the teeth (72,82) to engage to halt further torque transmission between the input shaft (20) and the output (28).

4 Claims, 1 Drawing Sheet

RESETTABLE PILOT OPERATED TORQUE LIMITER

FIELD OF THE INVENTION

This invention relates to torque limiters as, for example, torque limiters that may be interposed between a power drive unit and an aircraft control surface to be driven thereby.

BACKGROUND OF THE INVENTION

It is often necessary to use torque limiting devices in association with other machinery or equipment to prohibit the transfer of torques above some predetermined value so that damage to associated machinery or equipment does not occur. One typical application is an aircraft. Prime movers known as power drive units (PDU's), typically hydraulically powered, are utilized to move control surfaces of the aircraft as, for example, slats or flaps, between various positions. If movement of such an element is resisted as for example, by a mechanical jam in the drive line or some exterior influence exerting a force against the control surface preventing its movement, the power drive unit will tend to stall. Such units have high stall torques and as a consequence, if no steps are taken to prevent it, the stall torques can cause damage to the control surfaces, to the drive line, to the aircraft frame or all of the above.

A typical torque limiting device is illustrated in U.S. letters patent 4,030,578 issued Jun. 21, 1977 to Cacciola et al. In devices of this sort, a brake disc pack is employed and is compressed against a non-rotatable object as, for example, part of a housing. The compression is against the bias of a spring and the excess torque is taken up in the brake disc pack and grounded to the housing. Clearly, the coefficient of friction is a controlling factor in the amount of torque being taken up or absorbed within the brake disc pack.

Furthermore, the compression of the brake disc pack is obtained as a result of a ball ramp coupling that is interposed between the input to the torque limiter and the output thereof. In constructions such as that shown in the above-identified Cacciola et al patent, it is necessary that the balls in the ball ramp coupling be constructed of sufficient size so as to be capable of transmitting all of the torque up to the stalled torque level of the PDU to the brake disc pack to be absorbed thereby.

As a consequence of this type of construction, torque limiters have been fairly large and relatively unwieldy. They are unnecessarily heavy and thus impose a weight penalty in the environment in which they are most often used, namely, aircraft.

The present invention is directed to overcoming one or more of the above problems.

SUMMARY OF THE INVENTION

It is the principal object of the invention to provide a new and improved torque limiter. More specifically, it is an object of the invention to provide a torque limiter having a relatively few parts, and which may be constructed of relatively small size to thereby be compact and light weight.

An exemplary embodiment of the invention achieves the foregoing object in a construction including a housing including a rotary input and a rotary output. An expandable coupling is contained within the housing and has a drive element coupled to the input, a driven element coupled to the output, and one of the elements mounted for axial movement with respect to the element to which it is coupled. Means are included which extend between the elements and are operable to normally transmit torque from the drive element to the driven element up to a predetermined value and thereafter cause the axial movement of the one element. Two sets of teeth are provided. One is carried by the one element and the other is carried by the housing and both sets are disposed to engage with one another upon axial movement of the one element. As a consequence, the number of parts and the size of the torque limiter are reduced by elimination of a brake pack.

In a highly preferred embodiment, the one element is the drive element. In this embodiment of the invention, the expandable coupling need be sized only sufficiently large so as to transmit torque up to the predetermined value. The excess torque applied to the input is grounded to the housing on the input side rather than on the output side of the mechanism, thereby allowing a downsizing of the expandable coupling.

In a highly preferred embodiment, the coupling is a ball ramp coupling.

One embodiment of the invention contemplates a torque limiter that includes a housing together with a shaft journalled in the housing, which shaft is adapted to be connected to a source of rotary power. A rotary output is journalled in the housing and a ball ramp coupling is located within the housing. The ball ramp coupling includes an axially movable, drive element coupled to the shaft, a driven element coupled to the output and facing the drive element, a spring biasing the elements towards each other, facing ramps in the elements at the interface of the elements and balls in the ramps. A first set of teeth are carried by the drive element and a second set of teeth are carried by the housing in alignment with the first set. Consequently, when a predetermined resistance to rotation of the output is encountered, relative movement between the elements of the ball ramp coupling will occur which, in turn, will cause the balls to move the drive element axially relative to the driven element. The relative axial movement will cause the teeth of the first set to engage the teeth of the second set to ground out the input so that excess torque is delivered to the housing rather than to the output. In a highly preferred embodiment, the teeth of the sets have negative rake angles.

A preferred embodiment contemplates that the drive element be splined to the shaft for axial movement thereon. The drive element also is provided with opposed faces. One ramp of each ramp pair is in one of the faces and the teeth of the first set extend axially from the other of the faces of the drive element.

The invention also contemplates the provision of means mounting the second set of teeth for limited axial movement within the housing.

Preferably, second and third spring means are acting oppositely on the second set of teeth to normally locate the second set of teeth at an intermediate location between the extremes of its limited axial movement relative to the shaft.

In a highly preferred embodiment, the mounting means comprise a plurality of circumferentially spaced pins and the second spring means comprise compression coil springs impaled on respective ones of the pins.

In a highly preferred embodiment, the third spring is a wavy spring interposed between the housing and the second set of teeth and disposed about the shaft.

Preferably, the output comprises a sleeve on the shaft and has a gear on its exterior surface.

Other objects and advantages will become apparent from the following specification taken in connection with the accompanying drawings.

DESCRIPTION OF THE PREFERRED EMBODIMENT

Figure 1:
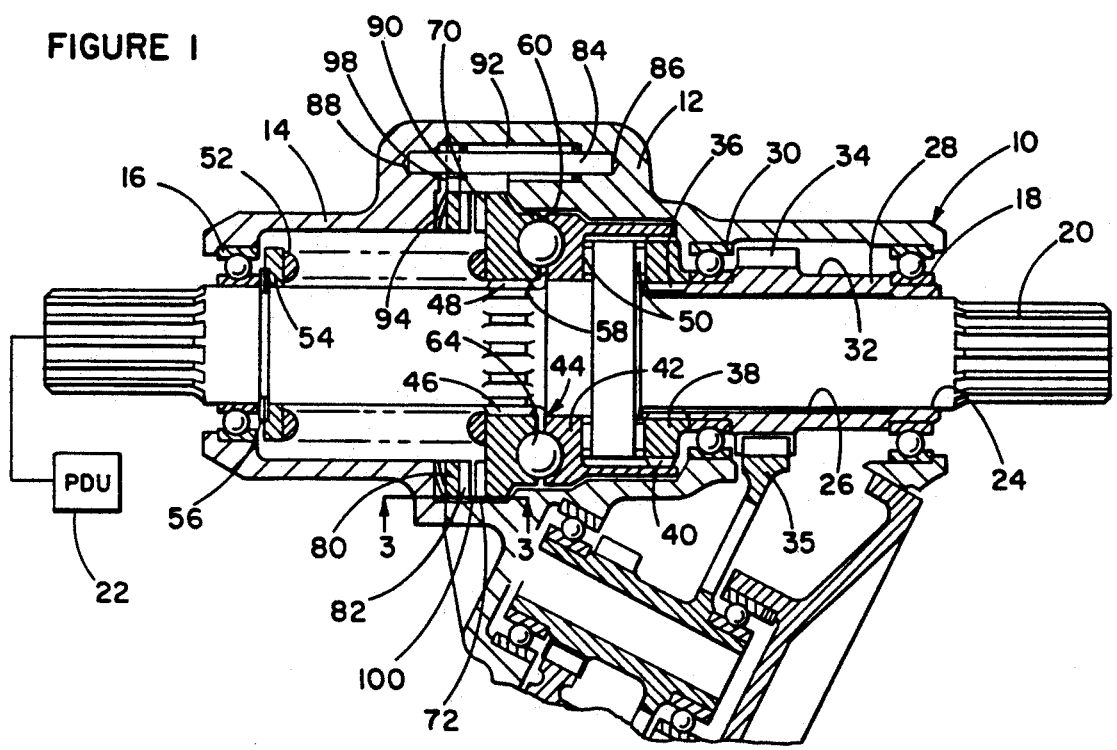
FIG. 1 is a sectional view of an actuator including a torque limiter made according to the invention.

An exemplary embodiment of the invention includes a housing, generally designated 10, made up of housing halves 12 and 14. Each of the housing halves 12 and 14 mounts bearings 16,18 which serve to journal a rotary shaft 20. The shaft 20 is an input shaft and typically will be connected to one or more power drive units or PDU's, one of which is shown schematically at 22. In the usual case, several of the actuators may be spaced out along the length of a wing or the like and be splined to one another so that a single PDU 22 may drive several of the actuators.

In reality, one end of the shaft 20 is journalled by a bearing surface 24 on the interior 26 of a sleeve 28. The sleeve 28 is in turn journalled by the bearing 18 as well as by an axially spaced bearing 30 within the housing half 12. On its exterior surface 32, the sleeve 28 includes a gear formation defined by teeth 34. The sleeve 28 thus serves as a rotary output from the housing which may be coupled to, for example, a gear 35 which in turn may be coupled via any rotary to reciprocating a motion converting mechanism to a flap or a slat.

A spline 36 couples the sleeve 28 to a ring 38 within the housing. On its radially outer surface, the ring 38 includes an additional spline 40 which is coupled to a driven element 42 forming part of a ball ramp coupling, generally designated 44. The drive element of the ball ramp coupling 44 is designated 46.

Thrust bearings 50 are employed where indicated and a compression coil spring 52 is impaled by the shaft at a location on the side of the drive element 46 opposite from the driven element 42. The compression coil spring 52 biases the drive element 46 toward the driven element 42 at some predetermined preload. The compression coil spring 52 is held at the desired preload by means of a washer 54 surrounding the shaft 20 which in turn is held in place by a lock ring 56.

Figure 2:
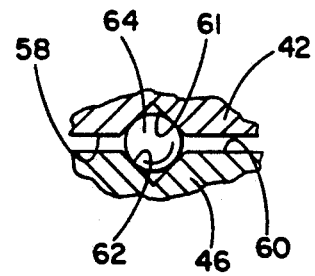
FIG. 2 is a fragmentary, somewhat schematic illustration of ball ramps in a ball ramp actuator employed in the invention.

As is well known, facing sides 58 and 60 of the driven element 42 and drive element 46 respectively are provided with pairs of ball ramps. As seen in FIG. 2, one ball ramp 61 is formed in the driven element 42 and another ball ramp 62 is formed in the face 60 of the drive element 46. The ball ramps 61 and 62 will be in nominal alignment with one another and a spherical ball 64 located to be partly disposed in each ball ramp 61 and 62 constituting a pair. Typically, three of the pairs will be located in the faces 58 and 60 at 120 degree increments thereabout.

As is well known, if relative rotary motion occurs between the elements 42 and 46, the balls 64 will tend to ride up their respective ramps and in so doing, exert a separating force between the faces 58, 60 of the elements 42, 46. This in turn will drive the drive element 46 to the left as viewed in FIG. 1. By appropriately selecting the spring 52 and the preload thereof, the maximum torque transmitted from the drive element to the driven element 42 via the balls 64 may be appropriately chosen, such that when the predetermined torque level is exceeded, as, for example, there is a jam in the system resisting rotary motion of the output sleeve 28, the spring 52 will exert insufficient force to keep the elements 42 and 46 in the relative positions illustrated in FIG. 1.

To absorb excess torque, it is desirable to ground the shaft 20. That is to say, it is desirable to halt rotation of the shaft 20 to prevent damage to equipment that may be driven thereby.

Figure 3:
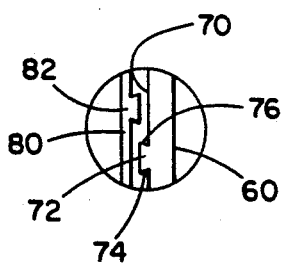
FIG. 3 is a fragmentary developed view taken approximately along the line 3—3 in FIG. 1.

To this end, the drive element 46 has a face 70 opposite the face 60. Extending axially from the face 70 are a series of teeth 72. As can be seen in FIG. 3, each side of each tooth 72 includes a diagonally inwardly extending surface 74 or 76 which defines a negative rake angle for both sides of the associated tooth 72.

A disc 80 mounted within the housing also carries axially extending teeth 82 which are aligned with and directed toward the teeth 72. Like the teeth 72, the teeth 82 have negative rake angles on both sides thereof as can be seen in FIG. 3.

A series of axially directed pins 84 (only one of which is shown) have their ends in respective bores 86 and 88 in the housing halves 12 and 14 respectively. The pins 84 extend through notches 90 in the periphery of the disc 80. The notches thus serve with the pins to mount the disc 80 for limited axial/rotational movement within the housing 10.

Compression coil springs 92 are provided and one is disposed about each of the pins 84 to be compressed against the housing half 12 and the right-hand side of the disc 80. Thus, the compression coil springs 92 (only one of which is shown) serve to bias the disc 80 to the left as viewed in FIG. 1.

A ring-like wavy spring 94 is disposed about the shaft 20 outwardly of the compression coil spring 52 to be interposed between the housing half 14 and the left-hand side of the disc 80 to exert an opposing bias against the disc 80. That is to say, the wavy spring 94 biases the disc 80 to the right as viewed in FIG. 1.

The arrangement is such that under normal conditions, the disc 80 occupies a position somewhere between the extreme limits of its travel within the housing 10. In this regard, a space 98 exists between the disc 80 and the housing half 14 under normal circumstances while a space 100 exists between the teeth 72 and 82 on the opposite side of the disc 80. When torque loading increases, relative rotation between the driven element 42 and the drive element 46 will occur as mentioned previously. The balls 64 will cause separation of the elements 42 and 46 with the later being moved axially to the left as viewed in FIG. 1. This will result in the teeth 72 coming into engagement with the teeth 82 and by reason of the negative rake angles on each, they will be drawn into firm abutment solidly locked together. Because the disc 80 which carries the teeth 82 is prevented from rotating by reason of its mounting on the pins 84, the stall torque of the PDU 22 will be transmitted to the housing 10 upon such lockup occurring. Of course, since the shaft 20 is prevented from rotating at his time, there can be no driving of the output sleeve 28 and damage to downstream components cannot occur as the excess torque is not being transmitted to them.

To set the device, it is only necessary to reverse the direction of rotation of the shaft 20. This will cause the teeth 72 to disengage from the teeth 82. The compression coil springs 92 upon disengagement of the teeth 72,82 will urge the disc 80 to the left as viewed in FIG. 1. At the same time the compression coil spring 52 will be urging the drive element 46 to the right. Because relative movement will occur between the elements 42 and 46 at this time, allowing the balls 64 to seat within the depths of the respective ball ramps 61,62 which in turn will allow the drive element 64 to move back to the position shown in FIG. 1 with the teeth 72 fully disengaged from the teeth 82.

If, during the engaging procedure, the axial faces of the teeth 72 and 82 abut one another preventing engagement, the ring 80 may move to the left as viewed in FIG. 1 across the space 98 against the bias of the wavy spring 94. This allows the teeth 72 to slip off of the teeth 82 and drop into the space between adjacent teeth so that upon a small amount of additional rotary movement, lockup will occur.

From the foregoing, it will be appreciate that because balls 64 need never transmit excess torque for the mechanism to be operative, they may be made only of that size required to transmit the predetermined amount of torque to the mechanism being driven. This permits smaller balls 64 to be utilized and permits the overall structure to be smaller.

Moreover, elimination of the brake disc pack in favor of the teeth eliminates a number of components to provide a simple construction and additionally allows a further decrease in the overall volume of the mechanism.

The use of the teeth provides for positive locking so that operation at the right point is not dependent on the coefficient of friction. Furthermore, location of the grounding mechanism, i.e. the disc 80 and teeth 82 on the input side of the mechanism and other constructional features described herein, allows the use of relatively high angles for the ramps 61 and 62 which, in turn, reduce the size of the springs required to achieve desired operation. In effect, the balls 64 are used as a sensor for a overload situation thus act as a pilot causing engagement of the brake which in turn is defined by the inter-engaging teeth 72,82.

All in all, a highly reliable, simple to construct, relatively small volume and low weight torque limiter is provided.

We claim:

1. A torque limiter comprising:
   a housing;
   a shaft journalled in said housing and adapted to be connected to a source of rotary power;
   a rotary output journalled in said housing;
   a ball ramp coupling within said housing including an axially movable drive element coupled to said shaft, a driven element coupled to said output and facing said drive element, a spring biasing said elements toward each other, facing ramps in said elements at the interface of said elements and balls in said ramps;
   a first set of teeth carried by said drive element;
   a second set of teeth carried by said housing and aligned with said first set;
   whereby, when a predetermined resistance to rotation of said output is encountered, relative movement between said elements will occur, which in turn will cause said balls to move said drive element axially relative to said driven element, said relative axial movement causing the teeth of said first set to engage with the teeth of said second set; and means mounting said second set of teeth for limited axial/rotational movement within said housing.

2. The torque limiter of claim 1 further including second and third spring means acting oppositely on said second set of teeth to normally locate said second set of teeth at an intermediate location between the extremes of its limited axial movement.

3. The torque limiter of claim 2 wherein said mounting means comprise a plurality of circumferentially spaced pins and said second spring means comprise compression coil springs impaled on respective ones of said pins.

4. The torque limiter of claim 3 wherein said third spring is a wavy spring interposed between said housing and said second set of teeth and about said shaft.

* * * * *